US010416676B2

(12) United States Patent
Naka et al.

(10) Patent No.: US 10,416,676 B2
(45) Date of Patent: Sep. 17, 2019

(54) OBSTACLE MONITORING DEVICE, VEHICLE CONTROL DEVICE AND WORK MACHINE

(71) Applicant: HITACHI CONSTRUCTION MACHINERY CO., LTD., Tokyo (JP)

(72) Inventors: Takuya Naka, Tokyo (JP); Takayuki Sato, Tsuchiura (JP); Yukihiko Ono, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/770,228

(22) PCT Filed: Sep. 8, 2016

(86) PCT No.: PCT/JP2016/076412
§ 371 (c)(1),
(2) Date: Apr. 23, 2018

(87) PCT Pub. No.: WO2017/085991
PCT Pub. Date: May 26, 2017

(65) Prior Publication Data
US 2018/0284787 A1    Oct. 4, 2018

(30) Foreign Application Priority Data

Nov. 19, 2015  (JP) ................................ 2015-226679

(51) Int. Cl.
*G05D 1/02*  (2006.01)
*B60W 30/09*  (2012.01)
(Continued)

(52) U.S. Cl.
CPC ........... *G05D 1/0214* (2013.01); *B60W 30/09* (2013.01); *B60W 30/095* (2013.01);
(Continued)

(58) Field of Classification Search
CPC ...... G05D 1/0214; G05D 1/0088; G05D 1/02; G05D 1/0223; G05D 1/024; B60W 30/09; B60W 30/095; G08G 1/00; G08G 1/017
(Continued)

(56) References Cited

U.S. PATENT DOCUMENTS 8,386,110 B2 *  2/2013  Maekawa ............ G05D 1/0217
180/168
9,633,438 B2 *  4/2017  Tanaka ................. G05D 1/0246
(Continued)

FOREIGN PATENT DOCUMENTS

JP     2007-91208 A     4/2007
JP     2008-102591 A    5/2008
(Continued)

OTHER PUBLICATIONS

International Search Report of PCT/JP2016/076412 dated Nov. 15, 2016.

*Primary Examiner* — Yazan A Soofi
(74) *Attorney, Agent, or Firm* — Mattingly & Malur, PC (57) ABSTRACT

An obstacle monitoring device includes a first object detecting section which detects a relative position of a first object located ahead in a moving direction of a vehicle, based on output data of a first moving-direction monitoring sensor, a second object detecting section which detects a relative position and profile of a second object, based on output data of a second moving-direction monitoring sensor which has a higher spatial resolution than the first moving-direction monitoring sensor, an interference determination section that determines whether the vehicle will interfere with the first object and also determines identity between the first object and the second object, and a profile determination section that, if the interference determination section has determined that the first object and the second object are
(Continued)

identical to each other, determines whether the profile of the second object will allow the vehicle to pass over the second object.

4 Claims, 8 Drawing Sheets

(51) Int. Cl.
  *B60W 30/095* (2012.01)
  *G05D 1/00* (2006.01)
  *G08G 1/00* (2006.01)
  *G08G 1/017* (2006.01)

(52) U.S. Cl.
  CPC ............ *G05D 1/0088* (2013.01); *G05D 1/02* (2013.01); *G05D 1/024* (2013.01); *G05D 1/0223* (2013.01); *G08G 1/00* (2013.01); *G08G 1/017* (2013.01); *G05D 2201/0202* (2013.01)

(58) Field of Classification Search
  USPC .......................................................... 701/23
  See application file for complete search history.

(56) References Cited

U.S. PATENT DOCUMENTS

2007/0046449 A1* 3/2007 Koike .................... B60Q 9/008
                                                           340/435
2018/0081368 A1* 3/2018 Watanabe ............ G05D 1/0238

FOREIGN PATENT DOCUMENTS

JP    2008-293205 A    12/2008
JP    2015-184903 A    10/2015

\* cited by examiner

OBSTACLE MONITORING DEVICE, VEHICLE CONTROL DEVICE AND WORK MACHINE

TECHNICAL FIELD

This invention relates to an obstacle monitoring device, vehicle control device and work machine, and especially to a technology that in a surface mine or the like, monitors whether there is any obstacle ahead in a moving direction of a haul vehicle.

BACKGROUND ART

As an example of travel control techniques for automotive vehicles, Patent Document 1 discloses a technique in which "in a vehicle control device configured to prevent occurrence of any interference by performing automatic braking or issuing an alarm to a driver if the distance between an own vehicle and a preceding vehicle as detected by a radar device decreases to a predetermined value or less, the reception level of a reflected wave for detecting a stationary object has a threshold set to be high in a predetermined region relative to the threshold of the reception level of a reflected wave of an electromagnetic wave radiated from the radar device such as a laser radar device or a pulse radar device for a moving object such as the preceding vehicle. As a consequence, it is possible to prevent any gate or road debris, which will not obstruct the own vehicle from being detected and misidentified as an obstacle and to prevent any unnecessary automatic braking or alarm from being applied or issued with respect to the gate or road debris." (extracted from the Abstract)

PRIOR ART DOCUMENT

Patent Document

Patent Document 1: JP 2008-102591 A

DISCLOSURE OF THE INVENTION

Problem to be Solved by the Invention

Techniques are available to mount a sensor such as a millimeter wave radar on a mining work machine, for example, a haul vehicle and to monitor whether there is any obstacle ahead in a moving direction of the own vehicle. To attempt an improvement in the haulage efficiency of a haul vehicle, it is desired to make the travel speed of the haul vehicle as high as possible. For this purpose, mounting of a moving-direction monitoring sensor with a long detection distance is preferred. However, such a sensor is low in spatial resolution so that a non-obstacle such as a concavity in or convexity on a road surface or an uphill may be detected as an obstacle and the haulage vehicle may make a false stop. On the other hand, a sensor of high spatial resolution can discriminate whether a detected object is an obstacle having any problem for traveling, but has a short detection distance, cannot make the travel speed high, and leads to a lowered haulage efficiency. A haul road in amine is unpaved, so that on a road surface, there are many concavities and convexities and debris such as rock or ore fallen from a preceding haul vehicle. These concavities in or convexities on the road surface and debris on the haul road include those which produce a reflected wave of high intensity. With respect to a mining work machine, there are, accordingly, a desire to accurately detect with high spatial resolution whether there is an obstacle that will prevent passage and another desire to avoid a reduction in haulage efficiency due to a decrease in travel speed. In this regard, the technique described in Patent Document 1 involves a problem that it cannot reconcile these two desires.

With the foregoing problem in view, the present invention has as an object thereof the provision of a technique that upon monitoring in a moving direction of a mining work machine, reconciles high spatial resolution and suppression of a de crease in travel speed.

Means for Solving the Problem

To achieve the above-described object, the present invention is characterized in that in an obstacle monitoring device to be mounted on a haul vehicle, the obstacle monitoring device includes: a first object detecting section that, based on output data of a first moving-direction monitoring sensor which detects a first object located ahead in a moving direction of the haul vehicle, detects a relative position of the first object to the haul vehicle; a second object detecting section that is a second moving-direction monitoring sensor which detects a second object located ahead in the moving direction of the haul vehicle, has a higher spatial resolution than the first moving-direction monitoring sensor, and, based on output data of the second moving-direction monitoring sensor which detects a side nearer in the moving direction of the haul vehicle than the first moving-direction monitoring sensor, detects a relative position of the second object to the haul vehicle and a profile of the second object; an interference determination section that determines, based on the relative position of the first object, whether the haul vehicle will interfere with the first object and also determines, based on the relative position of the first object and the relative position of the second object, identity between the first object and the second object; and a profile determination section that, if the interference determination section has determined that the first object and the second object are identical to each other, determines whether the profile of the second object will allow the haul vehicle to pass over the second object.

Advantageous Effects of the Invention

According to the present invention, it is possible to reconcile high spatial resolution and suppression of a decrease in travel speed upon monitoring in a moving direction of a mining work machine. Problems, configurations and advantageous effects other than those described above will become apparent from the following description of an embodiment.

BRIEF DESCRIPTION OF THE DRAWINGS

FIGS. 6A through 6E are diagrams illustrating states where the dump truck detects objects, in which

FIGS. 7A through 7E are diagrams illustrating states where the dump truck detects an object, in which

MODES FOR CARRYING OUT THE INVENTION

Figure 1:
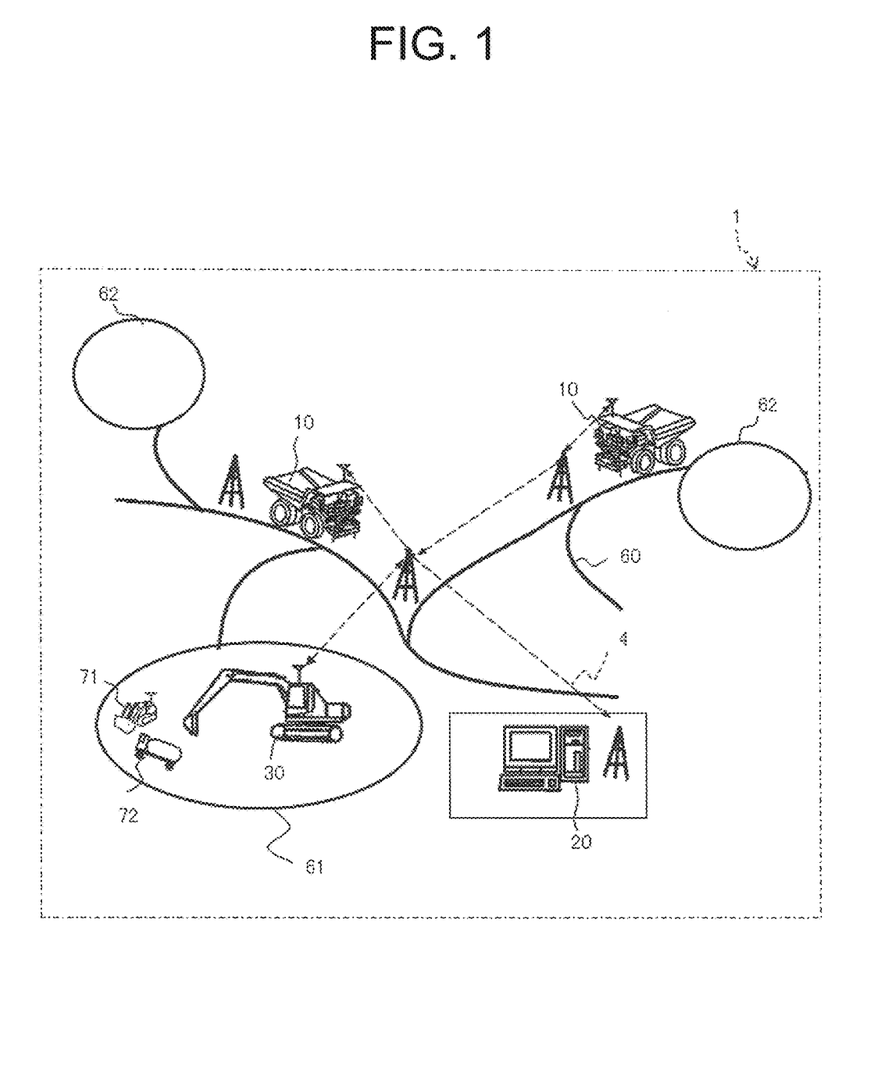
FIG. 1 is a schematic configuration diagram of an autonomous travel system for work machines on each of which a vehicle control device according to this embodiment is mounted.
Figure 2:
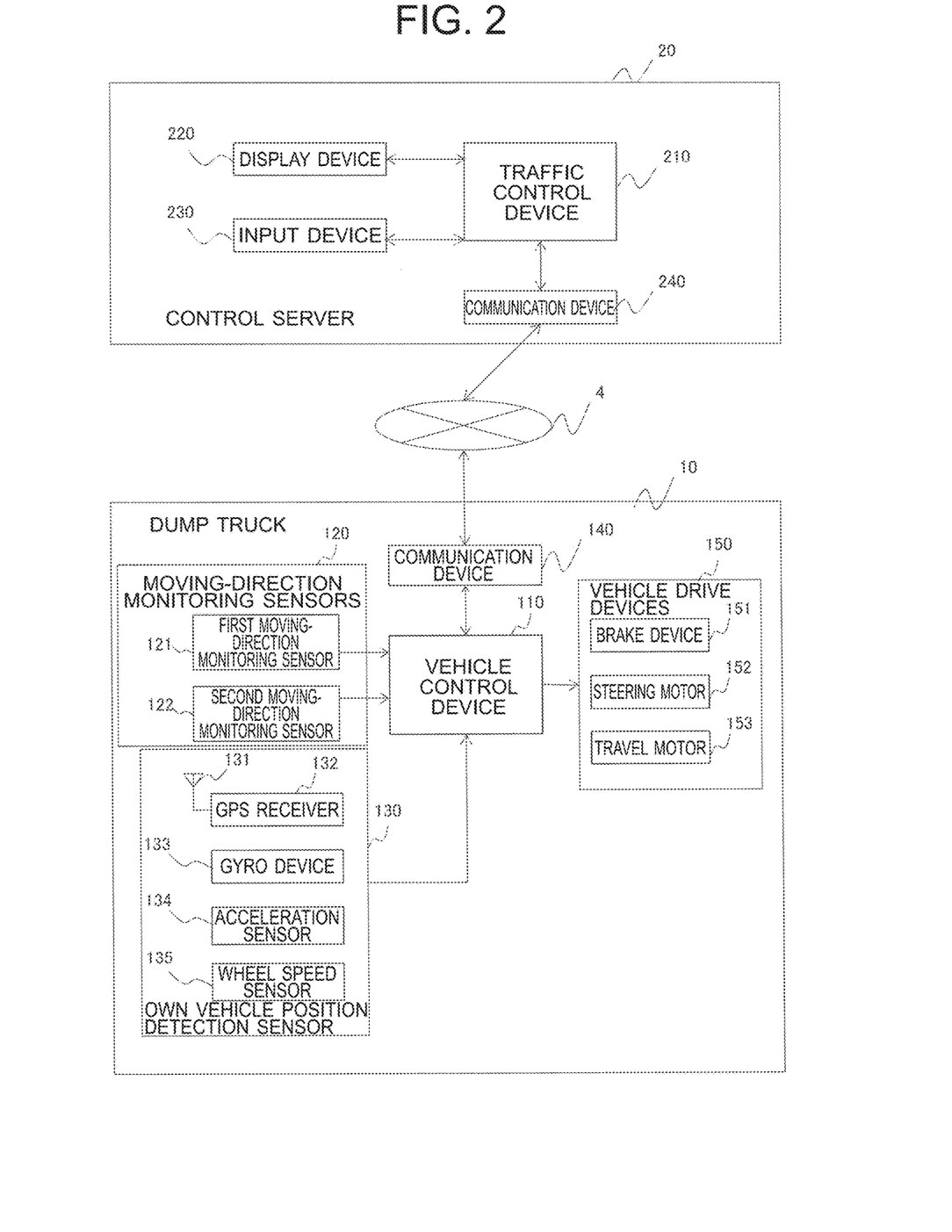
FIG. 2 is a functional block diagram depicting the hardware configurations of dump trucks and a control server, which make up the autonomous travel system.
Figure 3:
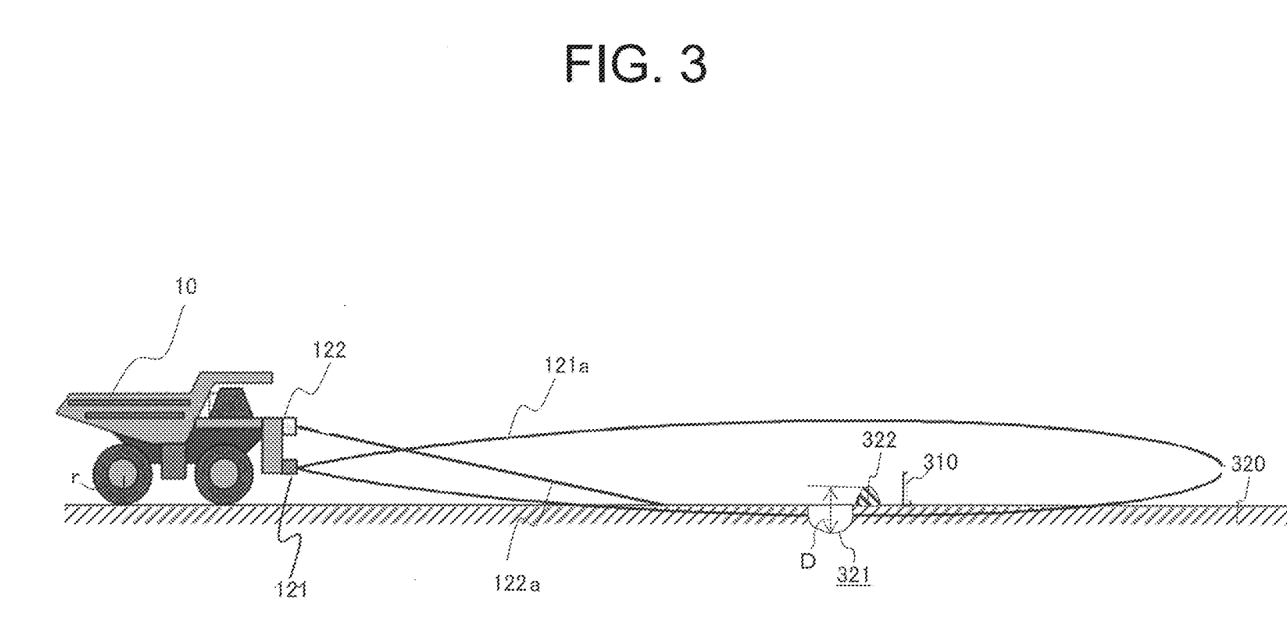
FIG. 3 is a diagram illustrating detection distances of moving-direction monitoring sensors mounted on each dump truck.

With reference to the drawings, a description will hereinafter be made about an embodiment of the vehicle control device according to the pre sent invention. FIG. 1 is a schematic configuration diagram of an autonomous travel system 1 for work machines on each of which a vehicle control device according to this embodiment is mounted. FIG. 2 is a functional block diagram depicting the hardware configurations of dump trucks 10 and a control server 20, which make up the autonomous travel system 1. FIG. 3 is a diagram illustrating detection distances of moving-direction monitoring sensors mounted on each dump truck.

In the following embodiment, term "interfere" or "prevent (passage)" will be used as a word representing the position or state relationship between a vehicle and an object. Here, the term "interfere" means a state where the object (for example, another vehicle or a first object or second object to be described subsequently herein) exits on a travel path of the vehicle and, if the vehicle continues to travel, the vehicle will come into contact with the object or will pass over the object. On the other hand, the term "prevent (passage)" means a state where the vehicle will come into contact with the object, resulting in a stop or will be unable to pass over the object, resulting in a stop (including, for example, a state where the vehicle will stop by a failure to ride over a convexity or a failure to come out of a concavity). Therefore, the term "prevent (passage)" is a mode of interference, and means a state where the vehicle stops as a result of its interference with the object.

The autonomous travel system 1 illustrated in FIG. 1 has been configured by connecting the dump trucks 10, as examples of autonomously traveling, mining work machines, and the control server 20, which is installed at a control center located near to or far from a quarry, together for communications via a wireless communication network 4. Arranged in a mine include a loading site 61 where an excavator 30 performs digging work and loads dug rock and ore on the dump trucks 10, dumping sites 62 where payloads hauled by the dump trucks 10 are dumped, and a haul road 60 connecting the loading site 61 and the dumping sites 62 together. Each dump truck 10 receives traffic control information from the control server 20 via the wireless communication network 4, and according to the traffic control information, autonomously travels at a predetermined travel speed set for the haul road 60.

The autonomously traveling, mining work machines are not limited to the dump trucks 10. If a bulldozer 71 and a sprinkler truck 72 are allowed to autonomously travel, for example, the present invention may also be applied to such work machines of types different from dump trucks.

As depicted in FIG. 2, each dump truck 10 includes a vehicle control device 110, moving-direction monitoring sensor 120, own vehicle position detection sensor 130, communication device 140, and vehicle drive devices 150.

The vehicle control device 110 determines a steering angle and a travel speed by using respective outputs from the moving-direction monitoring sensor 120 and own vehicle position detection sensor 130 and traffic control information received from the communication device 140, and to the vehicle control devices 150, outputs vehicle drive signals to allow the dump truck 10 to travel at the steering angle and travel speed so determined.

The vehicle control device 110 is an engine control unit (ECU) including various function configuration modules to be realized through execution of programs, which are stored in a memory, by a central processing unit (CPU).

The moving-direction monitoring sensor 120 includes plural types of moving-direction monitoring sensors of different characteristics. In this embodiment, two types of sensors, specifically a first moving-direction monitoring sensor 121 and a second moving-direction monitoring sensor 122 are included, and are both installed on the front of the dump truck (see FIG. 3). In this embodiment, about the moving-direction monitoring sensor 120, a description will be made by taking, as an example, a sensor that performs forward monitoring during forward moving of the dump truck 10. However, the moving-direction monitoring sensor 120 may be a sensor that performs rearward monitoring during rearward moving.

As the first moving-direction monitoring sensor 121, a selection is made of a sensor that can detect an object at a longer distance than the second moving-direction monitoring sensor 122. As the second moving-direction monitoring sensor 122, a selection is made of a sensor that is excellent in spatial resolution although it can detect only an object at a nearer distance than the first moving-direction monitoring sensor 121.

As illustrated in FIG. 3, the first moving-direction monitoring sensor 121 has a detection range 121a that includes a farther position than a detection range 122a of the second moving-direction monitoring sensor 122. Therefore, normally the first moving-direction monitoring sensor 121 first detects an object 310, and, as the dump truck 10 travels forward, the second moving-direction monitoring sensor 122 detects the object 310. Objects are not limited to obstacles on a road surface 320, but also include a concavity 321 in and a convexity 322 on the road surface 320.

At a mine site, millimeter wave radars and laser sensors are often used for their high robustness to dust and environmental changes such as fog, rain and lighting variations. A millimeter wave radar radiates an electromagnetic wave the wavelength range of which is generally from several millimeters to several tens millimeters, and can detect a relative distance to and a relative speed of a reflecting object by measuring the time until a reflected wave of the electromagnetic wave returns and a doppler shift. In general, a millimeter wave radar has higher robustness to environmental changes and can detect objects to a farther distance than other sensors, but is low in spatial resolution and can obtain only a reception intensity representing the reception level of a reflected wave and therefore, has a characteristic that it is difficult to discriminate whether a detected object is a concavity, convexity or fallen rock on the road surface or a manned vehicle.

On the other hand, a laser radar can detect the distance to a reflecting object by radiating a laser light and measuring the time until its reflected light returns. In general, a laser radar is inferior in the robustness to environmental changes than a millimeter wave radar, and its detection range may become shorter depending on the reflectivity of an object. For high spatial resolution, however, the laser radar has a characteristic that it can find the size and profile of the object.

In this embodiment, accordingly a millimeter wave radar is used as the first moving-direction monitoring sensor 121, and a laser radar is selected as the second moving-direction monitoring sensor 122. The millimeter wave radar and laser radar will hereinafter be designated by reference numbers 121 and 122, respectively.

The millimeter wave radar 121 is installed on a lower part of a front wall of the dump truck 10 substantially in parallel to the road surface 320, and detects an object located ahead of the dump truck 10. As the distance from the dump truck 10 increases, the detection range 121a of the millimeter wave radar 121 spreads in upward and downward directions, resulting in the inclusion of the road surface 320 in the detection range 121a and hence leading to the reception of a reflected wave from the road surface 320 by the millimeter wave radar 121. It is possible to reduce the reflected wave from the road surface 320 by setting upward the installation angle of the millimeter wave radar 121. Even if the installation angle is set so, however, the road surface 320 is still detected if the dump truck 10 pitches and oscillates or its body is caused to tilt by the payload during traveling.

On the other hand, the laser radar 122 is installed on an upper part of the front wall of the dump truck 10 so that it can detect a concavity, convexity or fallen rock on the road surface 320, a road shoulder, a manned vehicle lower in vehicle height than the dump truck 10, and the like, and is also installed downward so that a laser light reaches the road surface 320. The laser radar 122 employed in this embodiment is a sensor, which radiates a laser right sequentially at every predetermined angle over the detection range 122a of the laser radar to measure a relative distance to an object and to output relative distance information measured at the radiation angle.

The installation angle of the laser radar 122 relative to the road surface is determined according to the spatial resolution, and specifically is determined so that the laser radar 122 is provided with a spatial resolution capable of discriminating whether the profile of the object as detected by the laser radar 122 will not prevent passage of the dump truck 10, in other words, will allow the dump truck 10 to pass over the object. Preferably, the installation angle is determined to permit monitoring the road surface 320 to as far a distance as possible. In this manner, it is possible to make longer the braking distance after the detection of the object.

This embodiment is intended to detect a concavity in or convexity on a road surface, which will not interfere with passage of the dump truck 10, and to avoid a false stop which would otherwise be made by the detection. Therefore, the profile of an object is defined in terms of the height of the object and the depth of a concavity as measured from the road surface as a reference, that is, a range from a positive value (convex profile) to a negative value (concave profile) relative to the road surface as the reference (this range will hereinafter be called "passage allowable range"). It is to be noted that the profile of an object is not limited to its height but its size in a lateral direction or its pointed profile may be used as a reference for determination.

In this embodiment, the example of using the millimeter wave radar 121 and laser radar 122 is described. However, the first and second moving-direction monitoring sensors need not to be limited to these sensors, and sensors conforming to the above-described characteristics of the first and second moving-direction monitoring sensors may be selected. As the second moving-direction monitoring sensor, for example, a camera may be used, or a sensor using an electromagnetic wave different in frequency band from that of the millimeter wave radar may be used. Further, a laser radar or camera that can detect a distant place may be used as the first moving-direction monitoring sensor. Furthermore, when a laser radar is used as the second moving-direction monitoring sensor, the laser radar may also be installed so that its installation position and angle become different from those in this embodiment. In addition, no limitation shall be imposed on the radiation method of a laser light.

The own vehicle position detection sensor 130 includes a global positioning system (GPS) receiver 132, gyro device 133, acceleration sensor 134, and wheel speed sensor 135. The GPS receiver 132 detects the position and attitude of the own vehicle by receiving, at an antenna 131, radio waves transmitted from plural GPS satellites, the gyro device 133 and acceleration sensor 134 detect an acceleration, and the wheel speed sensor 135 can detect the rotational speed of a wheel of the vehicle. It is, however, to be noted that one or more sensors other than those mentioned above may also be used.

The communication device 140 is a wireless communication device to be connected to the wireless communication network 4.

The vehicle drive devices 150 include a brake device 151, steering motor 152, and travel motor (travel device) 153.

On the other hand, the control server 20 is configured including a traffic control device 210, display device 220, input device 230, and communication device 240.

The traffic control device 210 controls the work details, travel position and travel speed (including the stopped state) of each dump truck 10, sets a travel path, a travel-permitted zone, travel conditions and the like for the dump truck 10 in conformity to a work schedule at a work site, and outputs traffic control information, which indicates the details of the setting, to the communication device 240. The communication device 240 transmits the traffic control information to the dump truck 10, and also receives own vehicle position information from the dump truck 10.

The term "travel-permitted zone" means a region, which is a partially section in a target trajectory for each dump truck 10 as set on the haul road 60, the partially section extending in a moving direction on the target trajectory, and also includes a width in the lateral direction of the dump truck 10 traveling on the target trajectory. The travel-permitted zone is a region, which is provided to suppress interferences (including contacts and collisions) between dump trucks themselves traveling on the haul road 60. In the autonomous travel system 1 in this embodiment, the travel-permitted zone is, therefore, set as a region in which traveling of only the own vehicle is permitted. In other words, no other vehicles can enter the travel-permitted zone set for the own vehicle so that the travel-permitted zone for the own vehicle functions as a region closed for such other vehicles. As a consequence, interferences between dump trucks themselves are suppressed.

The display device 220 displays the travel-permitted zone set by the traffic control device 210 and the position of each dump truck 10 on the haul road 60.

The input device 230 is used as an interface when an operator at the control center inputs a signal to the traffic control device 210.

The communication device 240 is a wireless communication device for establishing wireless communication connection to the wireless communication network 4.

The traffic control device 210 is configured by the execution of software, which has been programmed to realize functions of the traffic control device 210, through hardware that includes, in addition to CPU, storage sections such as a read only memory (ROM), random access memory (RAM) and hard disk drive (HDD).

Figure 4:
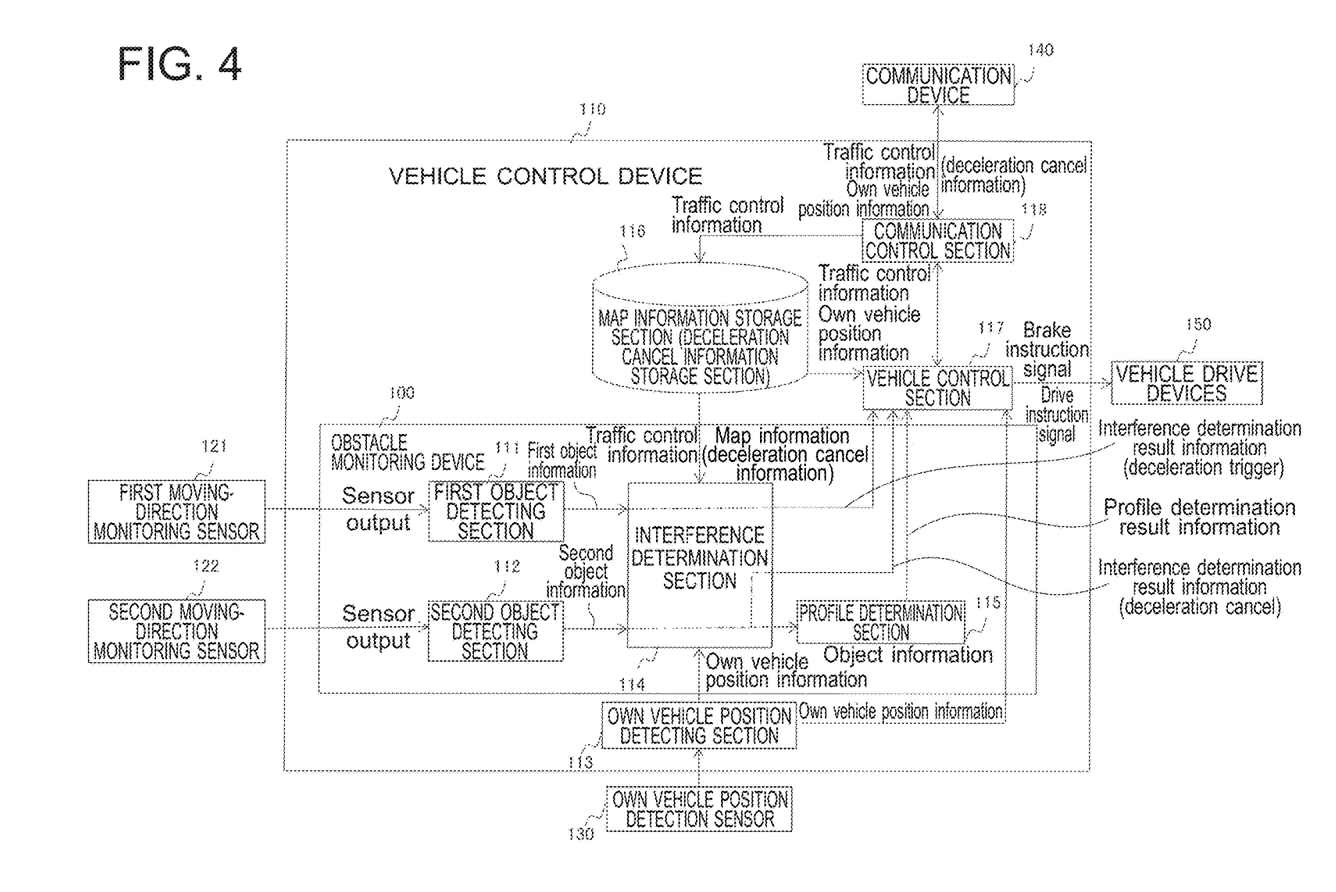
FIG. 4 is a block diagram depicting the software configuration of a vehicle control device in this embodiment.

Referring next to FIG. 4, a description will be made about detailed configuration of the dump truck 10. FIG. 4 is a block diagram depicting the software configuration of the vehicle control device in this embodiment.

An obstacle monitoring device 100 is configured including a first object detecting section 111, second object detecting section 112, interference determination section 114, and profile determination section 115. The vehicle control device 110 includes the obstacle monitoring device 100, an own vehicle position detecting section 113, a map information storage section 116, a vehicle control section 117, and a communication control section 118. A deceleration cancel information storage section and deceleration cancel information in FIG. 4 will be described subsequently herein.

The first object detecting section 111 and second object detecting section 112 have functions to detect the relative position and relative speed of an object, which exists ahead in the moving direction of the dump truck 10, to the dump truck 10, namely, the own vehicle based on output data of the moving-direction monitoring sensor 120, and to notify necessary object information to the interference determination section 114 and profile determination section 115.

Described in more detail, the first object detecting section 111 performs, based on information such as the relative distance to the first object, the relative speed of the first object, a reflection intensity from the first object, and the like as detected by the millimeter wave radar 121, processing such as elimination of data detected only a few times in succession and data of low reflection intensity and also coordinate conversion to a vehicle coordinate system based on a predetermined position of the vehicle. The performance of this processing can eliminate object-related information, which is detected only for a short period under influence of pitching of the vehicle, multipath propagations, and the like. The first object detecting section 111 also eliminates data of reflected waves of low intensity from a road surface and a shoulder such as a bank, and outputs information on the first object, which contains the relative distance to the first object, to the interference determination section 114.

The second object detecting section 112 detects, based on information on the relative distance as obtained at every radiation angle from the laser radar 122, the relative distance to and the relative speed of the second object, and the size and profile information on the second object such as its height from the road surface and its width, depth and the like. Similar to the first object detecting section 111, the second object detecting section 112 also performs processing such as elimination of data detected only a few times in time succession and also coordinate conversion to the vehicle coordinate system based on the predetermined position of the vehicle. The second object detecting section 112 also outputs information on the second object, which contains the relative distance to and profile information on the second object, to the interference determination section 114.

The own vehicle position detecting section 113 has functions to detect, based on output data of the own vehicle position detecting sensor 130, the position, attitude and travel speed of the own vehicle and to notify these information to the interference determination section 114 and vehicle control section 117.

The interference determination section 114 determines, based on the own vehicle position information obtained at the own vehicle position detecting section 113 and traffic control information (including travel path information and travel-permitted zone information) stored in the map information storage section 116, whether the first object exists within a scheduled travel range, specifically in the travel-permitted zone which has been assigned from the control server 20 and is to be passed through, and, if determined to exist, notifies information of the interference determination results as a trigger for deceleration control to the vehicle control section 117.

The interference determination section 114 may make the determination of interference or non-interference by using a travel path, which has been estimated based on motion information, such as a turning speed and a travel speed, of the dump truck 10 as obtained from the own vehicle position detecting section 113, instead of the map information stored in the map information storage section 116 and indicating a travel path. The travel path estimated based on the motion information may be used, for example, if there is an error in the position information obtained by the own vehicle position detecting section 113 or if the GPS receiver 132 in the own vehicle position detecting section 130 cannot be used. As a method for the estimation of the travel path, any method can be used. For example, the travel path may be estimated by determining a turning radius based on a yaw rate outputted from the gyro device 133 and a travel speed of the own vehicle which is based on a wheel speed outputted from the wheel speed sensor 135. As an alternative, the travel path may also be estimated based on a motion model of the own vehicle.

The profile determination section 115 determines based on information on the second object whether the profile of the second object will not prevent passage. In this embodiment, it is determined whether the height of the second object (including a concavity) is within the passage allowable range. The profile determination section 115 may further calculate one or all of the width and depth of the second object in addition to the height of the second object, and based on the combination of the calculated value or values and the height, may determine whether the dump truck 10 can pass over the second object. Further, the profile of the second object may be taken into consideration in addition to its size. When determined to have a pointed profile, for example, a notification may be made to the vehicle control section 117 even if the size is small. In this case, the sharpness of the contour profile of the second object may be determined, for example.

Stored in the map information storage section 116 are map information, which indicates the travel path on the haul route 60, and traffic control information, which has been notified from the control server 20 and includes travel conditions, such as the travel-permitted zone and travel speed.

The vehicle control section 117 has a function to allow the dump truck 10 to travel along the travel path based on the travel conditions and travel-permitted zone instructed from the control server 20 and the own vehicle position information notified from the own vehicle position detecting section 113. Further, the vehicle control section 117 outputs a brake instruction signal to actuate the brake device 151 based on information of the interference determination results and information of the profile determination results from the interference determination section 114 and profile determination section 115. The vehicle control section 117 also has a function to output a travel instruction signal to the travel motor 153 to allow the dump truck 10 to return to the set speed if the deceleration is determined to be canceled.

The communication control section 118 has a function to control intercommunications between the control server 20 and the dump truck 10 by using the communication device 140.

Figure 5:
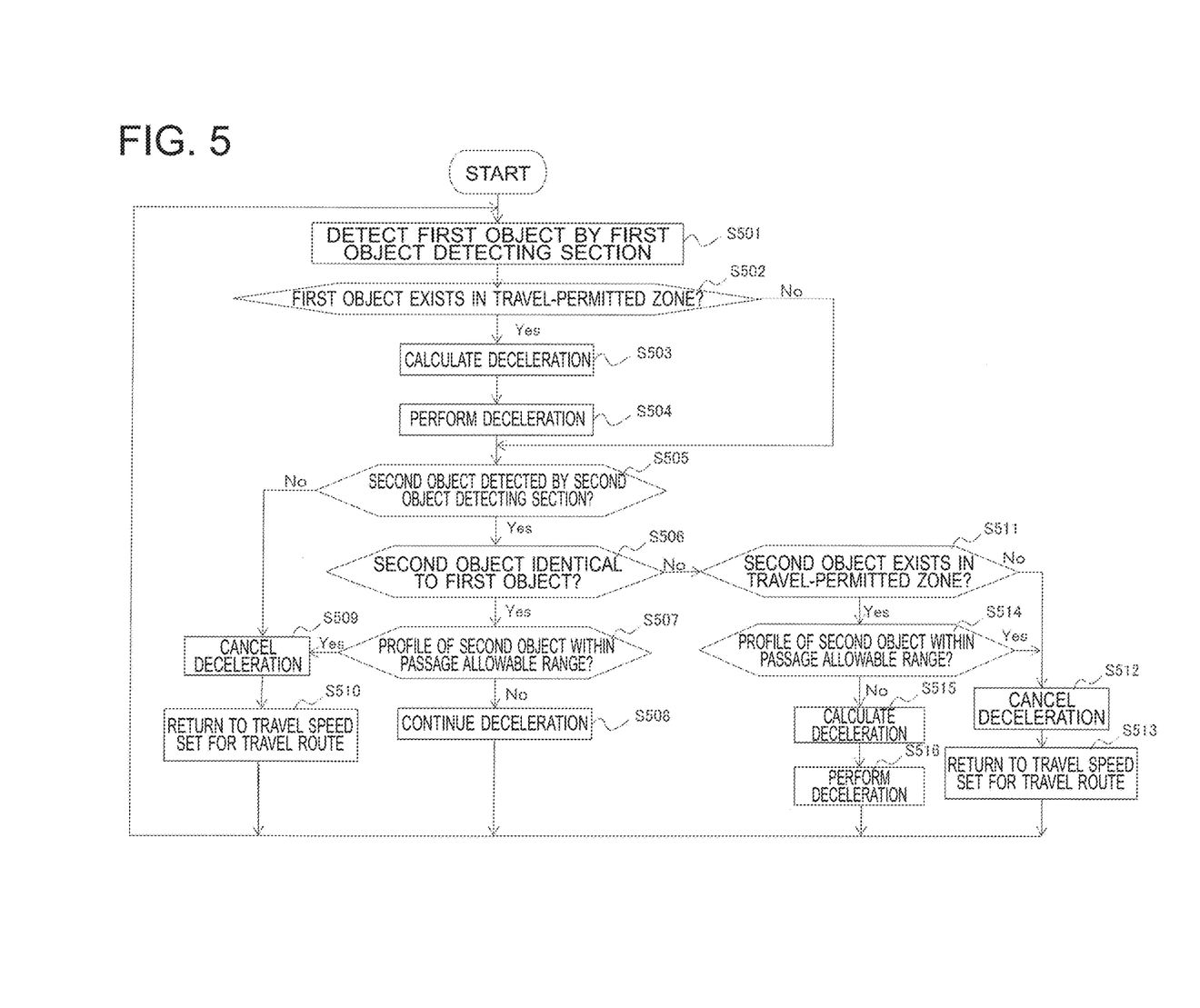
FIG. 5 is a flow chart illustrating the flow of moving-direction monitoring processing by the vehicle control device in this embodiment.
Figure 6A:
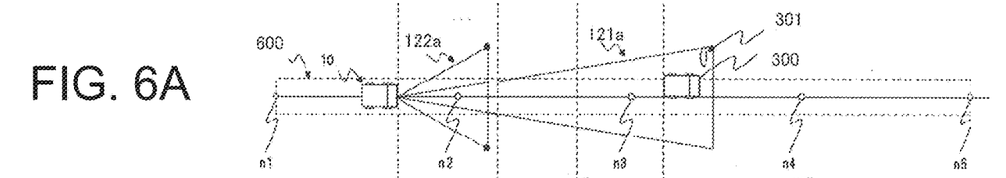
FIG. 6A illustrates the state where a millimeter wave radar has detected first objects.
Figures 6B, 6C:
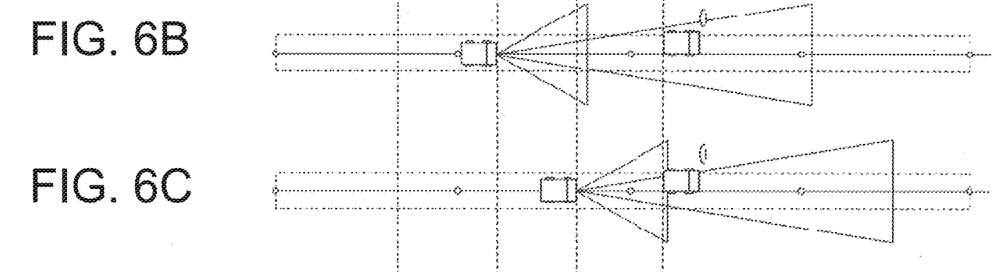
FIG. 6B illustrates the state where the dump truck is moving forward under deceleration.
FIG. 6C illustrates the state where a laser radar has detected a second object.
Figure 6D:
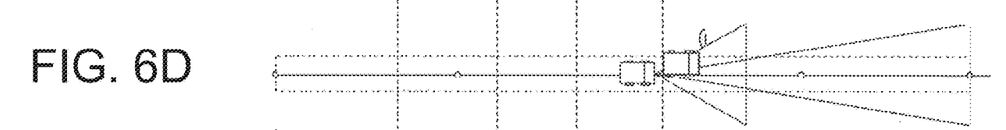
FIG. 6D illustrates the state where the dump truck has stopped before the first object which has been determined to interfere.
Figure 6E:
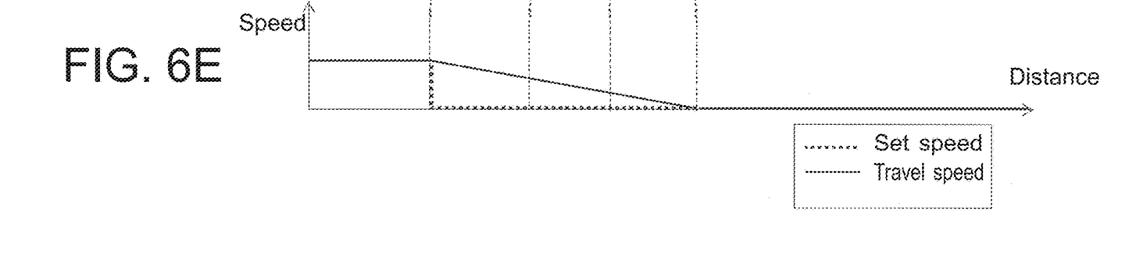
FIG. 6E is a diagram in which the travel speed and target speed of the dump truck are presented as functions of the travel position of the dump truck relative to the first object, which has been determined to interfere, or the second object in FIGS. 6A through 6D.
Figure 7A:
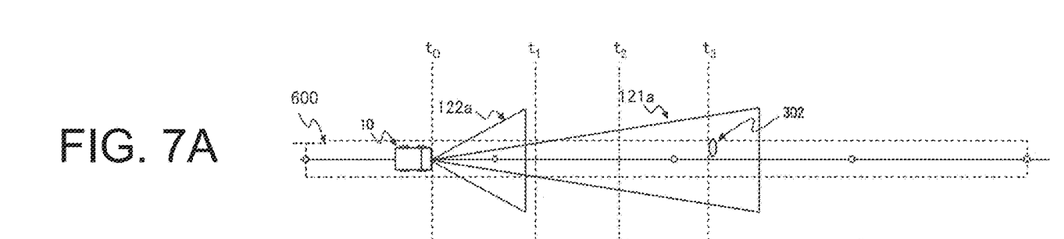
FIG. 7A illustrates the state where the millimeter wave radar has detected a first object.
Figure 7B:
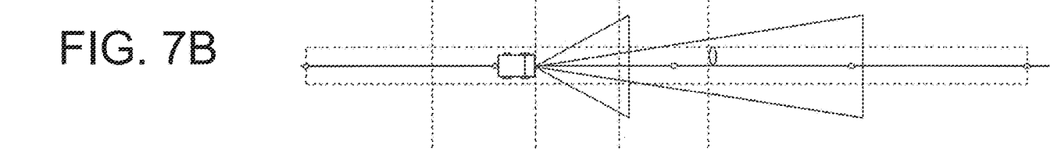
FIG. 7B illustrates the state where the dump truck is moving forward under deceleration.
Figure 7C:
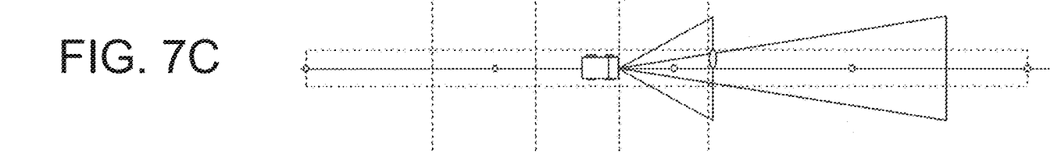
FIG. 7C illustrates the state where the laser radar has detected a second object.
Figures 7D, 7E:
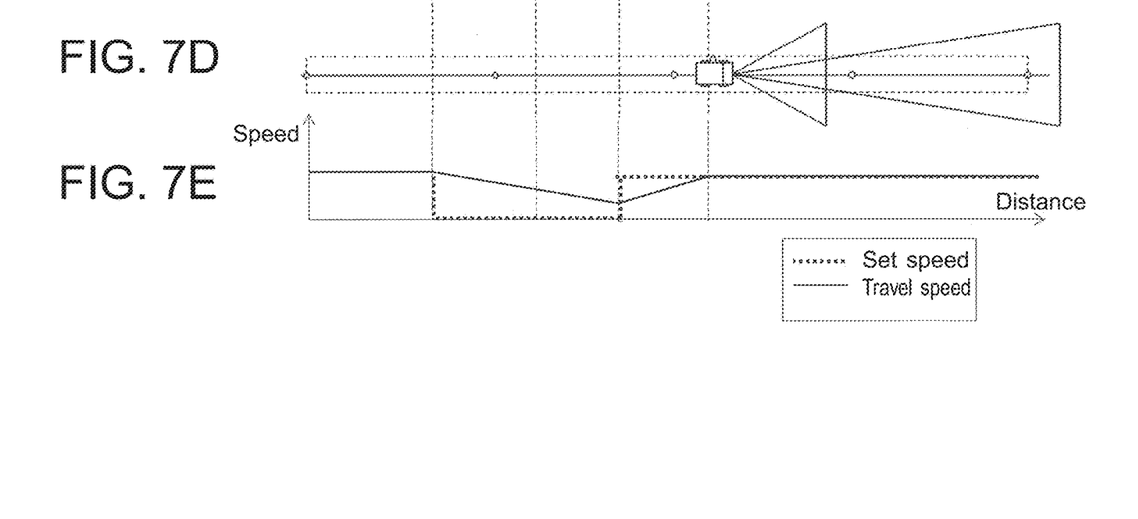
FIG. 7D illustrates the state where the dump truck is passing over the first object, in other words, the second object.
FIG. 7E is a diagram in which the travel speed and target speed of the dump truck are presented as functions of the travel position of the dump truck relative to the first or second object in FIGS. 7A through 7D.

Referring next to FIG. 5 through FIG. 7E, a description will be made about moving-direction monitoring processing by the vehicle control device 110 in this embodiment. FIG. 5 is a flowchart illustrating the flow of moving-direction monitoring processing by the vehicle control device 110 in this embodiment. FIGS. 6A through 6E are diagrams illustrating states where the dump truck detects objects, in which FIG. 6A illustrates the state where the millimeter wave radar has detected first objects, FIG. 6B illustrates the state where the dump truck is moving forward under deceleration, FIG. 6C illustrates the state where the laser radar has detected a second object, FIG. 6D illustrates the state where the dump truck has stopped before the first object which has been determined to interfere, and FIG. 6E is a diagram in which the travel speed and target speed of the dump truck (the set speed) are presented as functions of the travel position of the dump truck relative to the first object, which has been determined to interfere, or the second object in FIGS. 6A through 6D. FIGS. 7A through 7E are diagrams illustrating states where the dump truck detects an object, in which FIG. 6A illustrates the state where the millimeter wave radar has detected a first object, FIG. 7B illustrates the state where the dump truck is moving forward under deceleration, FIG. 7C illustrates the state where the laser radar has detected a second object, FIG. 7D illustrates the state where the dump truck is passing over the first object, in other words, the second object, and FIG. 7E is a diagram in which the travel speed and the target speed of the dump truck are presented as functions of the travel position of the dump truck relative to the first or second object in FIGS. 7A through 7D. Details of the processing will hereinafter be described in the order of steps in FIG. 5 while making reference to the examples of FIGS. 6A through 6E and FIGS. 7A through 7E.

It is to be noted that the target trajectory, along which the dump truck travels, is defined by nodes (n1, n2, n3, n4, n5) indicated by ○ (circles) in FIGS. 6A through 6D and FIGS. 7A through 7D and links indicated byline segments connecting the adjacent nodes together. Further, a travel-permitted zone 600 is set as a region extending along the target trajectory as a center baseline and having a width in the vehicle width direction (lateral direction) of the dump truck 10.

With reference to the map information stored in the map information storage section 116 and indicating the target trajectory, the dump truck 10 autonomously travels following the travel-permitted zone 600 assigned to the own vehicle by the control server 20. During the autonomous travel, the millimeter wave radar 121 and laser radar 122 perform sensing in front of the vehicle.

Based on information detected by the millimeter wave radar 121 during the travel, the first object detecting section 111 detects first objects 300,301 in front of the vehicle (S501), and outputs information on the first objects 300, 301, which contains the relative positions to and relative speeds of the first objects 300,301 to the own vehicle, to the interference determination section 114. In FIG. 6A, the first object detecting section 111 detects the first objects 300,301. In FIG. 7A, on the other hand, the first object detecting section 111 detects a first object 302.

The interference determination section 114 compares the information on the first objects and the travel-permitted zone 600 received from the control server 20, and determines whether the first objects are contained within the travel-permitted zone 600 (S502). In FIG. 6A, the first object 300 is determined to interfere as it exists within the travel-permitted zone 600, while the first object 301 is determined not to interfere as it exists outside the travel-permitted zone 600. The interference determination section 114 then notifies information of the interference determination results, which includes the relative position and relative speed of the first object 300, to the vehicle control section 117 (S502/Yes). In FIG. 7A, the interference determination unit 114 determines that the first object 302 exists within the travel-permitted zone 600 and will interfere.

If the interference determination section 114 determines that there is not a single object within the travel-permitted zone (S502/No), the processing proceeds to step S505.

Upon reception of the information of interference determination results that indicate to interfere with the first object, the vehicle control section 117 resets the target speed of the dump truck 100 from the travel speed, which the control server 20 has set, to a speed of zero (0) (see $t_0$ in FIG. 6E or FIG. 7E). The information of the interference determination results includes the relative distance to the first object. Based on the relative distance and the own vehicle position information (including the travel speed derived from the wheel speed of the own vehicle), the vehicle control section 117 calculates a deceleration a, which will be required for the own vehicle to stop before the first object 300 without coming into contact with the first object 300, by the following formula (1) (S503):

$$a = \frac{v_1^2}{2L_1} \tag{1}$$

where $v_1$ [m/s] represents the travel speed of the dump truck 10 at the time that the first object 300 or 302 has been detected by the first object detecting section 111, and $L_1$ [m] represents the relative distance to the first object 300 or 302.

Because the first object 300 or 302 is assumed to be in stop in this embodiment, the speed of the first object 300 or 302 is zero (0) [m/s].

The vehicle control section 117 outputs a brake instruction signal to the brake device 151 to brake at the deceleration a calculated in step S503 (S504).

After time $t_0$ at which the dump truck 10 has begun to decelerate, the dump truck 10 further moves forward. When the first object 300 or 302 enters the detection range 122a of the laser radar 122 and the second object detecting section 112 detects the first object 300 or 302 as a second object (S505/Yes, see FIG. 6C or FIG. 7C), the interference determination section 114 determines whether the detected second object 300 or 302 is identical to the first object 300 or 302 (S506).

As a method for performing identity determination, the first object and the second object may be determined to be the identical object, for example, if the difference between the relative position of the first object as contained in the information on the first object and the relative position of the second object as contained in the information on the second object is smaller than a predetermined value.

If the interference determination section 114 determines that the first object and the second object are identical to each other (S506/Yes), the interference determination section 114 notifies the information on the second object, which contains the relative position and profile of the second object, to the profile determination section 115, and the profile determination section 115 determines whether the profile of the second object is within the passage allowable range (S507).

If the profile determination section 115 determines that the profile of the second object is outside the passage allowable range (S507/No), the profile determination section 115 outputs information on the profile determination results to the vehicle control section 117, and the vehicle control section 117 allows the deceleration control to continue (S508). The dump truck 10 continues the deceleration, and finally stops before the first object 300 (see FIG. 6D). At this time, the travel speed decreases to zero (0) as indicated at time $t_3$ in FIG. 6E.

If the profile determination section 115 determines that the profile of the second object is within the passage allowable range (S507/Yes), on the other hand, the profile determination section 115 notifies information of the profile determination results, which indicates the results of the determination, to the vehicle control section 117. As the second object within the passage allowable range does not prevent passage of the dump truck 10 even if the dump truck 10 comes into contact with the second object or passes over the second object as it has traveled, the vehicle control section 117 cancels the deceleration control based on the information of the profile determination results (S509; see $t_2$ onwards in FIG. 7E), allows the travel speed to return so that it becomes a speed set for the travel path by the control server 20 (S510), and allows the dump truck 10 to pass over the second object 302 (see $t_3$ in FIG. 7D or FIG. 7E). The processing then returns to step S501. It is to be noted that, if the first object exists within the travel-permitted zone (S502/Yes) and if the second object detecting section 112 does not detect the second object (S505/No), for example, if in front of the own vehicle, a preceding vehicle is stopped or is traveling at a lower speed than the own vehicle and if, after being detected by the millimeter wave radar 121, the preceding vehicle travels at a higher speed than the own vehicle and does not enter the detection range of the laser radar 122, the vehicle control section 117 cancels the deceleration (S509) and allows the travel speed to return to the set speed (S510).

It is to be noted that, if the first object is not detected (step S502/No) and the second object is not detected either (step S505/No), steps S509 and S510 are skipped and the dump truck 10 continues to travel without deceleration at the travel speed set by the control server 20.

If the interference determination section 114 determines that the first object and the second object are not identical to each other (this is equivalent to the case that the second object detecting section 112 has detected a new object) (S506/No), the interference determination section 114 determines whether the second object, which has been determined not to be identical to the first object, exists within the travel-permitted zone 600 (S511).

If the second object does not exist within the travel-permitted zone 600 (S511/No), the second object will not interfere with the dump truck 10. Therefore, the vehicle control section 117 cancels the deceleration (S512) and allows the travel speed to return to the travel speed set for the travel path (S513), and the processing returns to step S501.

In passing, the case that the first object has not been detected (step S502/No) and the second object has been detected (step S505/Yes, step S506/No) means, for example, the case that the concavity 321, which is hardly detectable by the millimeter wave radar 121, has been detected by the laser radar 122. In this case, the dump truck 10 has not decelerated in step S503, so that steps S512 and S513 are skipped and the dump truck 10 continues to travel at the predetermined set travel speed.

If the interference determination section 114 determines that the second object different from the first object exists within the travel-permitted zone 600 (S511/Yes), the profile determination section 115 determines, as in step S507, whether the profile of the second object is within the passage allowable range (S514). If the profile determination section 115 determines that the profile of the second object is outside the passage allowable range (S514/No), the vehicle control section 117 calculates a deceleration required to stop the dump truck 10 before the second object (S515), and performs a deceleration (S516). Subsequently, the processing returns to S501.

If the profile of the second object different from the first object is determined to be within the passage allowable range (S514/Yes) and if the deceleration has been performed in S504, the deceleration is canceled (S512), and the travel speed is allowed to return to the travel speed set for the travel path (S513). Subsequently, the processing returns to step S501.

According to the vehicle control device of this embodiment, owing to the moving-direction monitoring performed using outputs of the plural sensors of different characteristics, the first object is detected to begin a deceleration by an output of the first moving-direction monitoring sensor having longer detection distance while a sufficient braking distance can be secured; after traveling closer to the second object, a determination is made using an output of the second moving-direction monitoring sensor of high spatial resolution as to whether the second object will prevent passage; and, if the second object is determined not to prevent the passage, the autonomous travel vehicle is allowed to return to the set travel speed and to continue to travel without avoiding the second object. As a consequence, if an object such as a concavity in or convexity on a road surface is detected as an obstacle, the autonomous travel vehicle would have heretofore stopped before the concavity in or convexity on the road surface. However, the vehicle control device of this embodiment can suppress stopping of the autonomous travel vehicle by the detection of such an object that does not prevent passage, and hence can perform efficient haul work.

If the first object and the second object are determined to be identical to each other by determining identity therebetween, the determination of interference with the second object can be omitted. If they are not identical to each other, a deceleration required to stop before the second object is calculated to enable avoidance of interference with the second object irrespective of whether a deceleration is under performance as a result of the detection of the first object or no deceleration has been performed because of no detection of the first object.

The embodiment of the present invention has been described above. However, the above-described embodiment by no means limits the present invention, and various modified embodiments are feasible within a scope not departing from the spirit of the present invention.

In the foregoing description, the deceleration a is calculated based on the travel speed and the relative distance to the object, but the deceleration a may be decreased, for example, in view of the sampling rate and spatial resolution of the second moving-direction monitoring sensor 122, to realize a travel speed at which the second moving-direction monitoring device 122 can adequately detect the second object. Described specifically, a deceleration that corresponds to the sampling rate of the second moving-direction monitoring sensor 122 may be calculated so that, when the detection range 122a of the second moving-direction monitoring sensor 122 reaches the first object, the travel speed of the autonomous travel vehicle becomes equal to a relative speed at which the second object can be detected with a spatial resolution capable of performing the determination of the profile of the second object, and the autonomous travel vehicle may then be decelerated at the deceleration. Further, it is possible not only to apply the vehicle control device with the obstacle monitoring device incorporated therein to an autonomous travel vehicle that requires them, but also to apply the obstacle monitoring device in combination with the display device and an alarm device to a manned vehicle.

Figure 8:
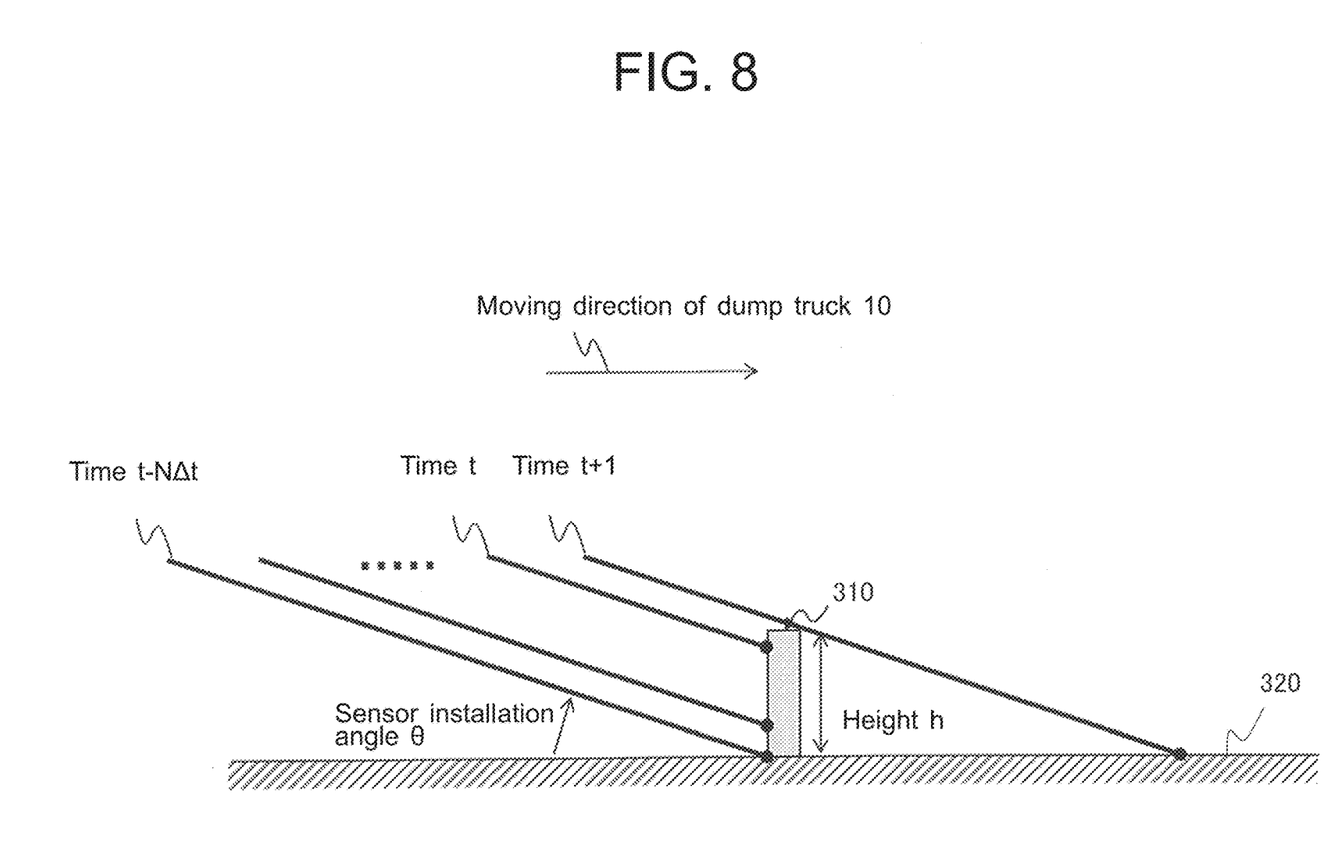
FIG. 8 is a diagram illustrating the relationship between the height of an object and a sensor installation angle θ.

A calculation example of the deceleration will be described with reference to FIG. 8. FIG. 8 is a diagram illustrating the relationship between the height of an object and the sensor installation angle θ. In the example of FIG. 8, if the laser radar 122 installed on the upper part of the front wall of the dump truck 10 is directed downward to radiate a laser light toward the road surface 320 at the sensor installation angle θ, the dump truck 10 is required to travel at a travel speed $v_r$ represented by the following formula (2) for the detection of the object 310 of a height h at least N times during traveling:

$$v_r \leq \frac{h}{N \cdot \Delta t \cdot \tan\theta} \quad (2)$$

where Δt [s] represents the sampling period of the laser radar 122, and the dump truck 10 is assumed to travel rightward as viewed in a direction perpendicular to the plane of the drawing sheet.

Assuming that the detection range 122a of the laser radar 122 has a length $L_{s2}$ [m], the travel speed of the dump truck 10 upon entrance of the object 310 within the detection range 122a of the laser radar 122 satisfies the following formula (3) by performing a deceleration at the deceleration a represented by the following formula (3):

$$a = \frac{v_1^2 - v_r^2}{2(L_1 - L_{S2})} \quad (3)$$

Here, the height h may be set equal to the height of an object which is desired to be detected by the laser radar 122. If it is desired to detect a vehicle having a height of 1.5 m, h may be set at 1.5 [m] (h=1.5 [m]). Depending on the characteristics of the used laser radar 122 and the extent of vibrations of the vehicle body, the detecting times N may be set to be as many times as the size of the object, which is desired to be detected, can be determined. Further, in the setting of the deceleration, one having a greater value may be selected out of the decelerations calculated in accordance with the formulas (1) and (3). By selecting the deceleration having the greater value, the dump truck 10 can be assured to stop before the obstacle.

If the deceleration a in the length $L_{S2}$ [m] within the detection range of the laser radar 122 as represented by the following formula (4) is smaller than a deceleration realizable by the brake device 151 of the dump truck 10, the deceleration that is calculated in step S503 may be set at zero (0), and no deceleration may be performed. It is, however, preferred to pay attention so that such a deceleration force as causing no slip is produced corresponding to the conditions of the road surface and the weight of the payload.

$$a = \frac{v_1^2}{2L_{s2}} \quad (4)$$

In the above-described example, the laser radar is used as the second moving-direction monitoring sensor, and the laser radiation and reception cycles are used as the sampling rate. If a stereo camera is used as the second moving-direction monitoring sensor, however, the frame rate may be used as the sampling rate.

As the passage allowable range is defined as such a value that does not prevent passage of the dump truck 10 even if the dump truck 10 interferes with the object, the passage allowable range may be set based on the tire radius and travel speed of the dump truck 10. As illustrated in FIG. 3, for example, the passage allowable range D (the depth of the concavity 321 and the height of the convexity 322) may be set relative to the tire radius r like the following formula (5):

$$-r/2 \leq D \leq r/2 \quad (5)$$

If the travel speed is faster, the passage allowable range D may be set narrower. If the steering angle is greater, the passage allowable range D may be set narrower even at the same travel speed.

When the present invention is applied to another work machine as a mining work machine instead of a haul vehicle such as the dump truck 10, the vehicle control device and vehicle control section in the above description correspond to a body control device, which performs travel control of the another work machine, and a body control section, which performs the travel speed control and brake control of the another work machine, respectively. Further, depending on the type of the work machine, the passage allowable range may be changed.

Moreover, as depicted in FIG. 4, a deceleration cancel information storage section may be further provided to store the position of the first object on the travel path upon cancellation of the deceleration in step S509 or S512, and it may be configured such that, when the dump truck 10 again reaches the position and detects the first object, the interference determination section 114 refers to the deceleration cancel information and the vehicle control section 117 does not perform the calculation of the deceleration by the detection of the first object and the performance of the deceleration (S503,S504). Using the log information of the detection information of the first object relevant to the cancellation of the deceleration, an unnecessary deceleration can be suppressed. Further, if the control server 20 is performing traffic control of plural dump trucks, the deceleration cancel information of the dump truck 10 as detected by the own vehicle may be transmitted to the control server 20, and may then be transmitted from the control server 20 to the remaining dump truck or dump trucks 10 to have its log recorded. As a consequence, deceleration cancel information generated, for example, by a vehicle traveling ahead can be used by each vehicle traveling behind. If it is desired to perform a vehicle-to-vehicle communication, the deceleration cancel information may be transmitted from a dump truck, which has generated the deceleration cancel information, to other vehicle without going through the control server 20.

In addition, the preset invention may be applied to a moving-direction monitoring technique for a manned vehicle which like a light vehicle for patrol or the like, travels under operation control by an operator riding thereon, and may also be used as a technique for suppressing a false notification upon notification to the operator at the time of detection of an obstacle. In this case, the "deceleration of the vehicle" described above shall be replaced by "notification".

LEGENDS

1: autonomous travel vehicle, 10: dump truck, 20: control server, 100: obstacle monitoring device, 110: vehicle control device.

The invention claimed is:

1. A vehicle control device configured to be mounted on an autonomous travel vehicle that autonomously travels at a predetermined travel speed on a predetermined travel path in a mine, comprising:
   a first moving-direction monitoring sensor which detects a first object located ahead in a moving direction of the autonomous travel vehicle;
   a second moving-direction monitoring sensor which detects a second object located ahead in the moving direction of the autonomous travel vehicle at a side nearer in the moving direction of the autonomous travel vehicle than the first moving-direction monitoring sensor,
   wherein the second moving-direction monitoring sensor has a higher spatial resolution than the first moving-direction monitoring sensor, and detects a side nearer in the moving direction of the autonomous travel vehicle than the first moving-direction monitoring sensor; and
   a processor programmed to:
      at a time of detecting the first object based on output data of the first moving-direction monitoring sensor, determine whether the first object will interfere with the autonomous travel vehicle;
      at a time of determining that the first object will interfere with the autonomous travel vehicle, decelerate the autonomous travel vehicle at a deceleration speed that is a speed at which determination of a profile of the second object can be performed based on output data of the second moving-direction monitoring sensor when a detection range of the second moving-direction monitoring sensor reaches the first object;
      at a time of detecting the second object based on the output data of the second moving-direction monitoring sensor during deceleration of the autonomous travel vehicle, determine whether the first object is identical to the second object;
      at a time of determining that the first object is identical to the second object, determine whether the profile of the second object determined based on the output data of the second moving-direction monitoring sensor is a profile which will allow the autonomous travel vehicle to pass over the second object;
      at a time of determining that the first object is identical to the second object and also determining that the profile of the second object is the profile which will allow the autonomous travel vehicle to pass over the second object, cancel the deceleration of the autonomous travel vehicle and allow the autonomous travel vehicle to return to the predetermined travel speed;
      at a time of determining that the first object is different from the second object, determine whether the second object will interfere with the autonomous travel vehicle;
      at a time of determining that the second object will interfere with the autonomous travel vehicle, determine whether the profile of the second object determined based on the output data of the second moving-direction monitoring sensor is the profile which will allow the autonomous travel vehicle to pass over the second object; and
      at a time of determining that the second object will interfere with the autonomous travel vehicle and also determining that the profile of the second object is a profile which inhibits the autonomous travel vehicle from passing over the second object, decelerate the autonomous travel vehicle at a deceleration speed required to stop the autonomous travel vehicle before the second object.

2. The vehicle control device according to claim 1, wherein the processor is further programmed to:
   at the time of determining that the first object is identical to the second object and also determining that the profile of the second object is the profile which will allow the autonomous travel vehicle to pass over the second object, store deceleration cancel information including a position on the travel path, at which the first object relevant to the cancellation of the deceleration has been detected;
   at a time of detecting a new first object based on the output data of the first moving-direction monitoring sensor, compare a relative position of the new first object and the deceleration cancel information with each other to determine whether the new first object is identical to the first object relevant to the cancellation of the deceleration; and
   at a time of determining that the new first object is identical to the first object relevant to the cancellation of the deceleration, allow the autonomous travel vehicle to travel at a predetermined travel speed without deceleration.

3. The vehicle control device according to claim 2, wherein the processor is further programmed to:
   receive the deceleration cancel information from a control server that performs traffic control of the autonomous travel vehicle, or from another autonomous travel vehicle that is traveling on the travel path; and
   store the deceleration cancel information received from the control server or the another autonomous travel vehicle.

4. A work machine that autonomously travels at a predetermined travel speed on a predetermined travel path in a mine, comprising:
- a first moving-direction monitoring sensor which detects a first object located ahead in a moving direction of the work machine;
- a second moving-direction monitoring sensor which detects a second object located ahead in the moving direction of the work machine at a side nearer in the moving direction of the work machine than the first moving-direction monitoring sensor, and has a higher spatial resolution than the first moving-direction monitoring sensor;
- vehicle drive devices including a brake device and a travel device; and
- a vehicle control device is configured to output a brake instruction signal or a travel instruction signal to the vehicle drive devices,
- wherein the vehicle control device is further configured to:
  - at a time of detecting the first object based on output data of the first moving-direction monitoring sensor, determine whether the first object will interfere with the work machine;
  - at a time of determining that the first object will interfere with the work machine, output the brake instruction signal to the vehicle drive devices so as to decelerate the work machine at a deceleration speed that is a speed at which determination of a profile of the second object can be performed based on output data of the second moving-direction monitoring sensor when a detection range of the second moving-direction monitoring sensor reaches the first object;
  - at a time of detecting the second object based on the output data of the second moving-direction monitoring sensor during deceleration of the work machine, determine whether the first object is identical to the second object;
  - at a time of determining that the first object is identical to the second object, determine whether the profile of the second object determined based on the output data of the second moving-direction monitoring sensor is the profile which will allow the work machine to pass over the second object;
  - at a time of determining that the first object is identical to the second object and also determining that the profile of the second object is the profile which will allow the work machine to pass over the second object, output the travel instruction signal to the vehicle drive devices so as to cancel the deceleration of the work machine and allow the work machine to return to the predetermined travel speed;
  - at a time of determining that the first object is different from the second object, determine whether the second object will interfere with the work machine;
  - at a time of determining that the second object will interfere with the work machine, determine whether the profile of the second object determined based on the output data of the second moving-direction monitoring sensor is the profile which will allow the work machine to pass over the second object; and
  - at a time of determining that the second object will interfere with the work machine and also determining that the profile of the second object is a profile which inhibits the work machine from passing over the second object, output the brake instruction signal to the vehicle drive devices so as to decelerate the work machine at a deceleration speed required to stop the work machine before the second object.

* * * * *